United States Patent
Wu

(10) Patent No.: US 7,117,250 B1
(45) Date of Patent: Oct. 3, 2006

(54) METHOD AND SYSTEM FOR PROVIDING A DYNAMIC MEDIA DISTRIBUTION INFRASTRUCTURE

(75) Inventor: Bo Wu, San Jose, CA (US)

(73) Assignee: Enreach Technology, Inc., Santa Clara, CA (US)

( * ) Notice: Subject to any disclaimer, the term of this patent is extended or adjusted under 35 U.S.C. 154(b) by 585 days.

(21) Appl. No.: 09/631,058

(22) Filed: Aug. 1, 2000

(51) Int. Cl.
  *G06F 15/16* (2006.01)
  *H04L 9/00* (2006.01)
(52) U.S. Cl. .................. 709/217; 709/200; 709/203; 709/219; 380/49
(58) Field of Classification Search ............. 709/229, 709/320, 203, 219, 231; 705/57, 58, 67, 705/51; 713/163, 165, 176, 201
See application file for complete search history.

(56) References Cited

U.S. PATENT DOCUMENTS

| | | | |
|---|---|---|---|
| 5,509,074 A * | 4/1996 | Choudhury et al. ........ 713/176 |
| 5,867,579 A * | 2/1999 | Saito ........................... 705/57 |
| 5,915,021 A * | 6/1999 | Herlin et al. ................. 705/67 |
| 5,974,141 A * | 10/1999 | Saito ........................... 705/52 |
| 6,002,772 A * | 12/1999 | Saito ........................... 705/58 |
| 6,006,332 A * | 12/1999 | Rabne et al. ............... 713/201 |
| 6,081,794 A * | 6/2000 | Saito et al. ................... 705/57 |
| 6,263,377 B1 * | 7/2001 | Monday et al. ............. 719/320 |
| 6,301,660 B1 * | 10/2001 | Benson ....................... 713/165 |
| 6,385,596 B1 * | 5/2002 | Wiser et al. .................. 705/51 |
| 6,560,707 B1 * | 5/2003 | Curtis et al. ................ 713/163 |
| 2001/0047401 A1 * | 11/2001 | McTernan et al. .......... 709/219 |

\* cited by examiner

*Primary Examiner*—Bunjob Jaroenchonwanit
*Assistant Examiner*—Philip Lee

(57) ABSTRACT

The general idea of one embodiment in accordance with the present invention is to provide a dynamic media distribution infrastructure. For example, once a client computer downloads encrypted media content (e.g., audio, video, graphics, information, software, data, etc.) from an existing media supplier, it becomes a part of the media distribution infrastructure. Specifically, the client computer is now able to provide that specific downloaded media content to other requesting client computers in an encrypted format. It should be appreciated that within the present embodiment, a directory server computer regulates the distribution of media content over the dynamic media distribution infrastructure.

32 Claims, 6 Drawing Sheets

METHOD AND SYSTEM FOR PROVIDING A DYNAMIC MEDIA DISTRIBUTION INFRASTRUCTURE

TECHNICAL FIELD

The present invention relates to the field of media content. More specifically, the present invention relates to the field of distributing media content.

BACKGROUND ART

Modern research and technology have provided society with a wide variety of electronic devices. It is appreciated that some of these modern electronic devices are very powerful and useful to their users. For example, some of the electronic devices which fall into this category include: computers which occupy large office space down to computers which are held in one's hand, satellites which orbit around earth relaying a multitude of communication signals, global positioning system (GPS) devices capable of determining the specific locations of their users on the earth, cellular phones which enable their users to communicate wirelessly with other people, to name a few. Additionally, it should be appreciated that some modern electronic devices also provide entertainment to their users. For instance, some of the electronic devices which fall into this category include: portable and fixed radio receivers which provide their users music along with a wide array of different audio programming, video game consoles which challenge their users with varying situations within different virtual realities, portable and fixed compact disc (CD) players which provide music to their users, and portable and fixed televisions which provide a wide variety of visual and audio programming to their users.

Currently, in order to provide entertaining media content to the general public, there are many different ways to distribute it. For example, television content providers distribute their television content to the general public by broadcasting it via different types of communication networks (e.g., wireless, wired, or a combination of both). As such, the general public is able to receive hundreds of channels of television programming within their respective households and/or businesses via personal satellite dishes (large or small), coaxial cables, and the like.

In another example, video content providers distribute their video content to the general public by utilizing computer network infrastructures such as local area networks (LANs) and/or the Internet. Specifically, these type of computer network infrastructures typically include a main frame computer which functions as the main source for distributing video content. Furthermore, the video content source computer is connected to several designated cache server computers which also distribute video content. As such, a client computer that requests a download of video content may receive it from the video source computer or from one of the designated cache servers. Usually, if one of the cache servers is located closer to the client computer than the video source computer, that cache server provides the requested video content to the client computer. In this manner, the designated cache server computers are utilized to off-load some of the video distribution functionality performed by the video content source computer.

It should be appreciated that there are disadvantages associated with the video distribution infrastructure described above. For example, the video content source computer and designated cache servers may be overwhelmed by too many requests for video content downloads such that they cannot handle them in a timely manner. In other words, the video download response time of the video distribution infrastructure may be adversely prolonged.

Another disadvantage associated with the type of video distribution infrastructure described above is that it is usually costly to increase its distribution capacity in order to handle a larger amount of video download requests. For example, one common way to increase the distribution capacity of the video distribution infrastructure is to add more dedicated cache servers to it in order to help fulfill the download requests for video content. However, buying and properly setting up additional cache servers to handle video download requests can be expensive to a company.

DISCLOSURE OF THE INVENTION

Accordingly, a need exists for a method and system which provides a media distribution infrastructure which is not easily overwhelmed by too many requests for video content downloads such that it cannot handle them in a timely manner. Furthermore, a need exists for a method and system which provides a media distribution infrastructure which is not expensive to expand. The present invention provides a method and system which accomplishes the above described needs.

The general idea of one embodiment in accordance with the present invention is to provide a dynamic media distribution infrastructure. For example, once a client computer downloads encrypted media content (e.g., audio, video, graphics, information, software, data, etc.) from an existing media supplier, it becomes a part of the media distribution infrastructure. Specifically, the client computer is now able to provide that specific downloaded media content to other requesting client computers in an encrypted format. It should be appreciated that within the present embodiment, a directory server computer regulates the distribution of media content over the dynamic media distribution infrastructure.

In another embodiment, the present invention includes a method for providing a dynamic media distribution infrastructure in order to distribute media content. The method includes the step of a first client device communicating with a directory device in order to receive encrypted media content from a media supplier. The method also includes the step of the first client device receiving the encrypted media content from the media supplier. Furthermore, the method includes the step of the first client device receiving an encryption key capable of decrypting the encrypted media content. Moreover, the method includes the step of a second client device receiving the encrypted media content from the first client device. Additionally, the method includes the step of the second client device receiving the encryption key capable of decrypting the encrypted media content.

In still another embodiment, the present invention includes a system for providing a dynamic media distribution infrastructure in order to distribute media content. The system includes a media supplier adapted to transmit media content that is encrypted. Additionally, the system includes a first client device coupled to the media supplier and adapted to receive the media content that is encrypted from the media supplier. The first client device is adapted to receive a first encryption key adapted to decrypt the media content that is encrypted. The system also includes a directory device adapted to couple the first client device to the media supplier. Moreover, the system includes a second client device coupled to the first client device and adapted to receive the media content that is encrypted from the first client device. The second client device is adapted to receive a second encryption key adapted to decrypt the media content that is encrypted.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
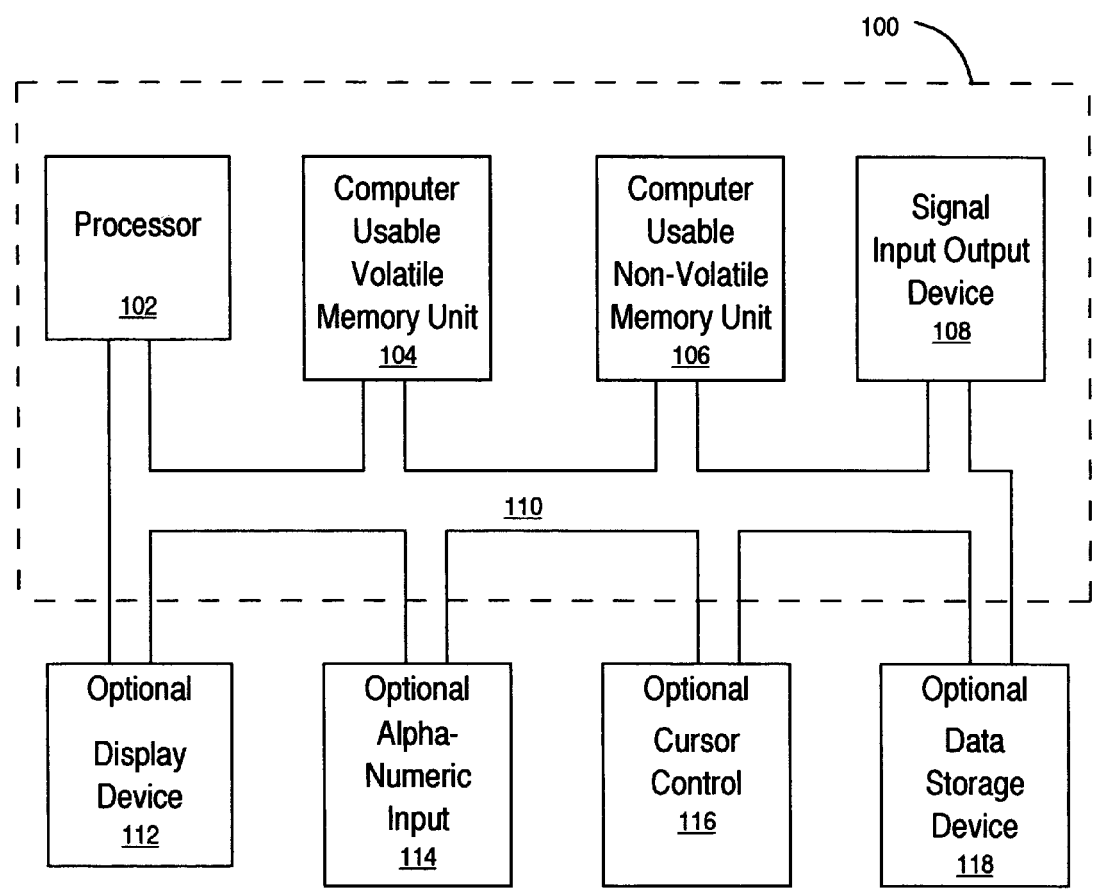
FIG. 1 is a block diagram of one embodiment of an exemplary computer system used in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "recognizing" or "utilizing" or "determining" or "outputting" or "transmitting" or "communicating" or "encrypting" or "decrypting" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

FIG. 1 is a block diagram of one embodiment of an exemplary computer system 100 used in accordance with the present invention. It should be appreciated that system 100 is not strictly limited to be a computer system. As such, system 100 of the present embodiment is well suited to be other types of electronic devices (e.g., set-top-box, digital recording/play back device, personal digital assistant, mobile phone, pager, etc.). Within the following discussions of the present invention, certain processes and steps are discussed that are realized, in one embodiment, as a series of instructions (e.g., software program) that reside within computer readable memory units of computer system 100 and executed by processor(s) of system 100. When executed, the instructions cause system 100 to perform specific actions and exhibit specific behavior which is described in detail below.

In general, computer system 100 of FIG. 1 used by an embodiment of the present invention comprises an address/data bus 110 for communicating information, one or more central processors 102 coupled with bus 110 for processing information and instructions. Central processor unit 102 may be a microprocessor or any other type of processor. The computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes a signal generating and receiving device 108 coupled with bus 110 for enabling system 100 to interface with other electronic devices.

Optionally, computer system 100 can include a display device 112 which is coupled to bus 110 for displaying video and/or graphics. It should be appreciated that optional display device 112 may be a cathode ray tube (CRT), flat panel liquid crystal display (LCD), field emission display (FED), or other display device suitable for displaying video and/or graphic images and alphanumeric characters recognizable to a user. Furthermore, the system 100 can include an optional alphanumeric input device 114 including alphanumeric and function keys coupled to the bus 110 for communicating information and command selections to the central processor (s) 102.

Additionally, the computing device 100 of FIG. 1 can include an optional cursor control or cursor directing device 116 coupled to the bus 110 for communicating user input information and command selections to the central processor (s) 102. The cursor directing device 116 can be implemented using a number of well known devices such as a mouse, a track-ball, a track pad, an optical tracking device, a touch screen, etc. Alternatively, it is appreciated that a cursor can be directed and/or activated via input from alphanumeric input device 112 using special keys and key sequence commands. The present invention is also well suited to directing a cursor by other means such as, for example, voice commands. In addition, the cursor directing device 116 can also be a remote control device (e.g., a universal remote control device having a number of buttons, dials, etc.) with an infra-red signal communication capability. System 100 can also include a computer usable mass data storage device 118 such as a magnetic or optical disk and disk drive (e.g., hard drive or floppy diskette) coupled with bus 110 for storing information and instructions.

Figure 2:
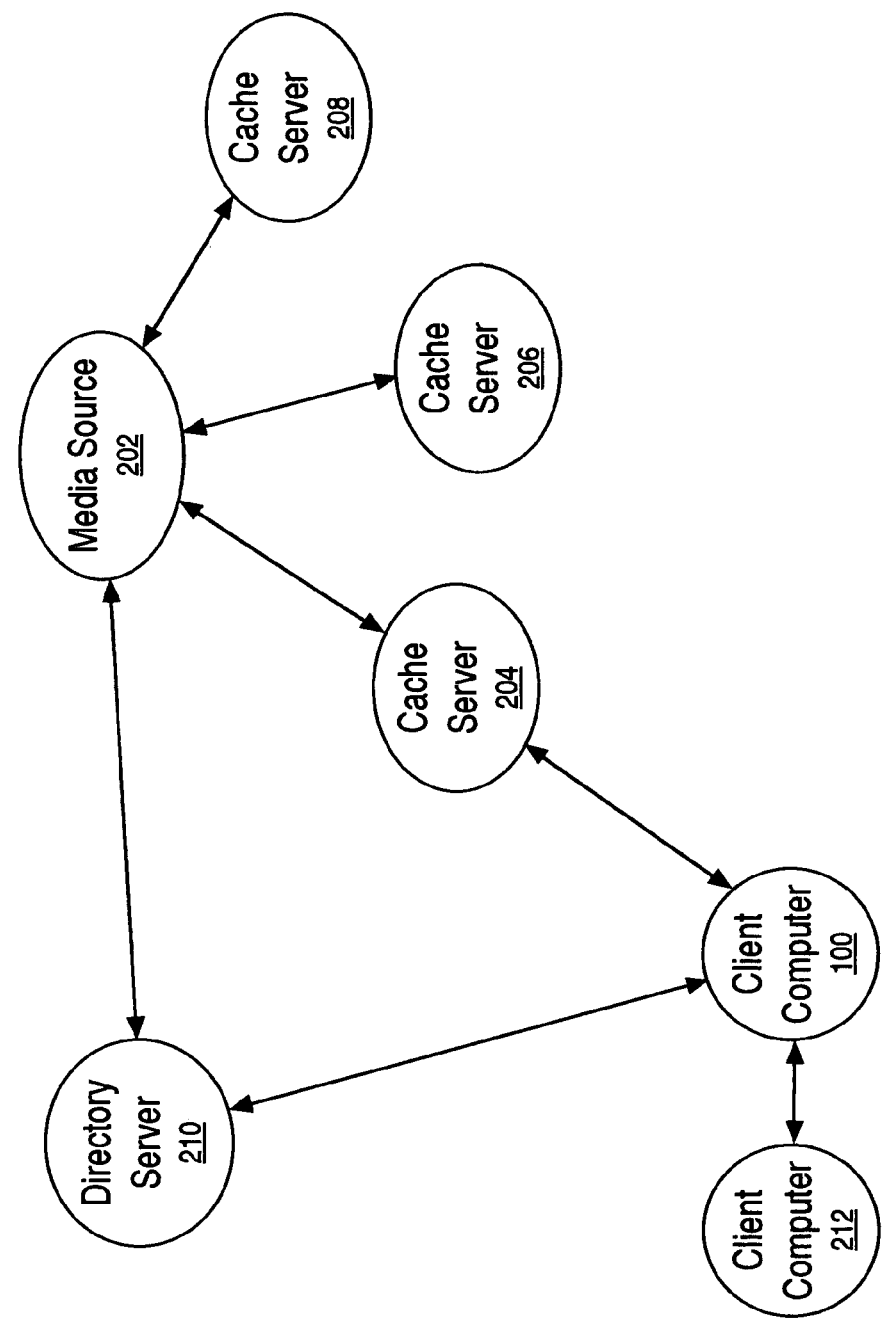
FIG. 2 is a block diagram illustrating one embodiment of a dynamic media distribution infrastructure in accordance with the present invention.

FIG. 2 is a block diagram illustrating one embodiment of a dynamic media distribution infrastructure 200 in accordance with the present invention. The general idea of the present embodiment is that once a client computer (e.g., 100) downloads encrypted media content and special software from a media supplier, it becomes a part of the distribution infrastructure. Specifically, once client computer 100 has downloaded the encrypted media content and special software, it is able to provide that media content to other requesting client computers (e.g., 212). Within the present embodiment, the special software regulates the distribution of media content from one client computer to other client computers. Moreover, once client computer 212 successfully downloads media content and the special software from client computer 100, it also becomes a part of the media distribution infrastructure. As such, the present embodiment provides a dynamic media distribution infrastructure.

It should be understood that media content of the present embodiment is well suited to include a wide variety of media content in many different formats. For example, the media content may include audio, video, graphics, information, data, software, and/or the like. Furthermore, a media supplier of the present embodiment is well suited to include media sources (e.g., 202), cache server computers (e.g., 204, 206 and 208), client computers, and/or any other type of device that has media content available for download.

Infrastructure 200 includes media source 202 (e.g., radio station, television broadcast company, graphics vendor, television cable company, software vendor, publisher, and the like) coupled to cache server computers 204–208. As such, cache server computers 204–208 are coupled to receive and store media content output from media source 202 for subsequent distribution to client computers (e.g., 100 and 212). Furthermore, a directory server computer 210 is coupled with media source 202 and client computer 100. Additionally, client computer 100 is coupled to client computer 212. It should be appreciated that media source 202, cache servers 204–208, directory server 210, and client computers 100 and 212 of the present embodiment are well suited to be coupled in a wide variety of implementations. For example, these several devices of media distribution infrastructure 200 may be coupled via coaxial cable, copper wire, the Internet, fiber optics, wireless communication, and the like. Moreover, media source 202, cache servers 204–208, directory server 210, and client computer 212 may be implemented in a variety ways in accordance with the present embodiment. For example, the several different devices of infrastructure 200 may each be implemented in a manner similar to computer system 100 of FIG. 1. However, the devices of infrastructure 200 are not strictly limited to such an implementation.

Within the dynamic media distribution infrastructure 200 of FIG. 2, it is appreciated that media content may be distribution in a variety of ways. For example, when a user of client computer 100 desires to download media content within infrastructure 200, the user may cause client computer 100 to initially communicate with directory server 210. While communicating, the user of client computer 100 may need to register with directory server 210 before downloading media content. This registration process may include the user of client computer 100 specifying the particular media content he or she desires to download. Furthermore, if the user is required to pay for downloading the media content, the registration process may include the user inputting (for example) his or her name, credit card number, and/or mailing address. It should be understood that this registration information may be subsequently transmitted by directory server 210 to media source 202 for further processing and/or collection.

Once the registration process is completed, directory server 210 may couple (e.g., automatically) client computer 100 to a media supplier (e.g., one proximately located to client computer 100) which has the requested media content. Conversely, directory server 210 may provide a list of active media suppliers to client computer 100 and request that its user choose a media supplier to receive the requested media content from. In order to create the list of media suppliers, directory server 210 may determine which media suppliers have the media content requested by client computer 100 by checking a list stored within one of its memory devices. Additionally, directory server 210 may determine which media suppliers are currently active. Moreover, directory server 210 may determine which media supplier is proximately located to client computer 100. Once the list of active media suppliers is created by directory server 210, the user of client computer 100 is able to choose a media supplier to receive the requested media content from. Once a media supplier is chosen, directory server 210 couples client computer 100 to that media supplier.

Once communicatively coupled to the media supplier (e.g., cache server 204), client computer 100 is capable of downloading the desired media content. During the downloading process, special software of the present embodiment operating on the media supplier encrypts and transmits the desired media content to client computer 100 which subsequently stores it. Within the present embodiment, it should be appreciated that the media content may or may not be encrypted differently each time it is output from a media supplier. Sometime during the downloading process, the special software operating on the media supplier also transmits an encryption key to client computer 100 enabling it to subsequently decrypt and use the encrypted media content. Furthermore, during the downloading process the special software operating on the media supplier also transmits (e.g., unknowingly) a copy of the special software to client computer 100. Once the downloading process has been completed, the media supplier discontinues communication with client computer 100.

Referring still to FIG. 2, it should be appreciated that once client computer 100 has successfully downloaded the requested media content and the special software from the media supplier, client computer 100 is capable of being a media supplier to other client computers (e.g., 212). For example, if a user of client computer 212 desires to download any of the media content already downloaded and stored by client computer 100, he or she can download it locally from client computer 100 instead of downloading it remotely from another media supplier device (e.g., cache server 204). Specifically, the user of client computer 212 causes it to communicate with the special software of the present embodiment stored on client computer 100. This special software provides the download interface whereby client computer 212 is able to download specific media content stored by client computer 100. It should be understood that the special software operating on client computer 100 controls the media content downloading process of the present embodiment from one client computer to other client computers. Furthermore, the special software of the present embodiment does not allow its corresponding media content to be downloaded without a client device interacting with its download interface.

As part of the download interface, the special software includes a registration process similar to the one described above. That is, the registration process may request that the user of client computer 212 specifying the media content he or she desires to download from client computer 100. Moreover, if the user is required to pay for receiving the media content, the registration process of the special software may include the user inputting (for example) his or her name, credit card number, and/or mailing address. It should be understood that this registration information may be subsequently transmitted by client computer 100 to directory server 210 which then transfers the registration information to media source 202 for further processing and/or collection.

Upon completion of the registration process, client computer 100 begins the downloading process of the requested media content. Specifically, the special software operating on client computer 100 encrypts and transmits the requested media content to client computer 212 which subsequently stores it. Within the present embodiment, it should be appreciated that the media content may or may not be encrypted differently each time it is output from a media supplier. At some point during the downloading process, the special software causes client computer 100 to also transmit an encryption key to client computer 212 thereby enabling it to subsequently decrypt and use the encrypted media content. It should be appreciated that the encryption keys received by client computers 100 and 212 may be similar or different from each other. Additionally, during the downloading process the special software causes client computer 100 to also transmit a copy of the special software of the present embodiment to client computer 212. Once the downloading process has been completed, client computer 100 subsequently discontinues communication with client computer 212. It is appreciated that once client computer 212 has successfully downloaded the requested media content and the special software from client computer 100, client computer 212 is capable of being a media supplier to other client computers. Therefore, the dynamic media distribution infrastructure 200 is able to continue to grow larger as more client computers download media content along with the special software of the present embodiment.

There are several advantages associated with the dynamic media distribution infrastructure 200 of FIG. 2. For example, dynamic media distribution infrastructure 200 is more efficient in fulfilling media content download requests by enabling client computers to download media content from a larger amount of media content suppliers. Furthermore, the dynamic media distribution infrastructure 200 is not easily overwhelmed by too many requests for media downloads because the more clients that download media content, the more media content suppliers exist. Moreover, the present embodiment provides a media distribution infrastructure which is not expensive to expand since the client computers do not need to be purchased in order to add them to the distribution infrastructure.

Figure 3:
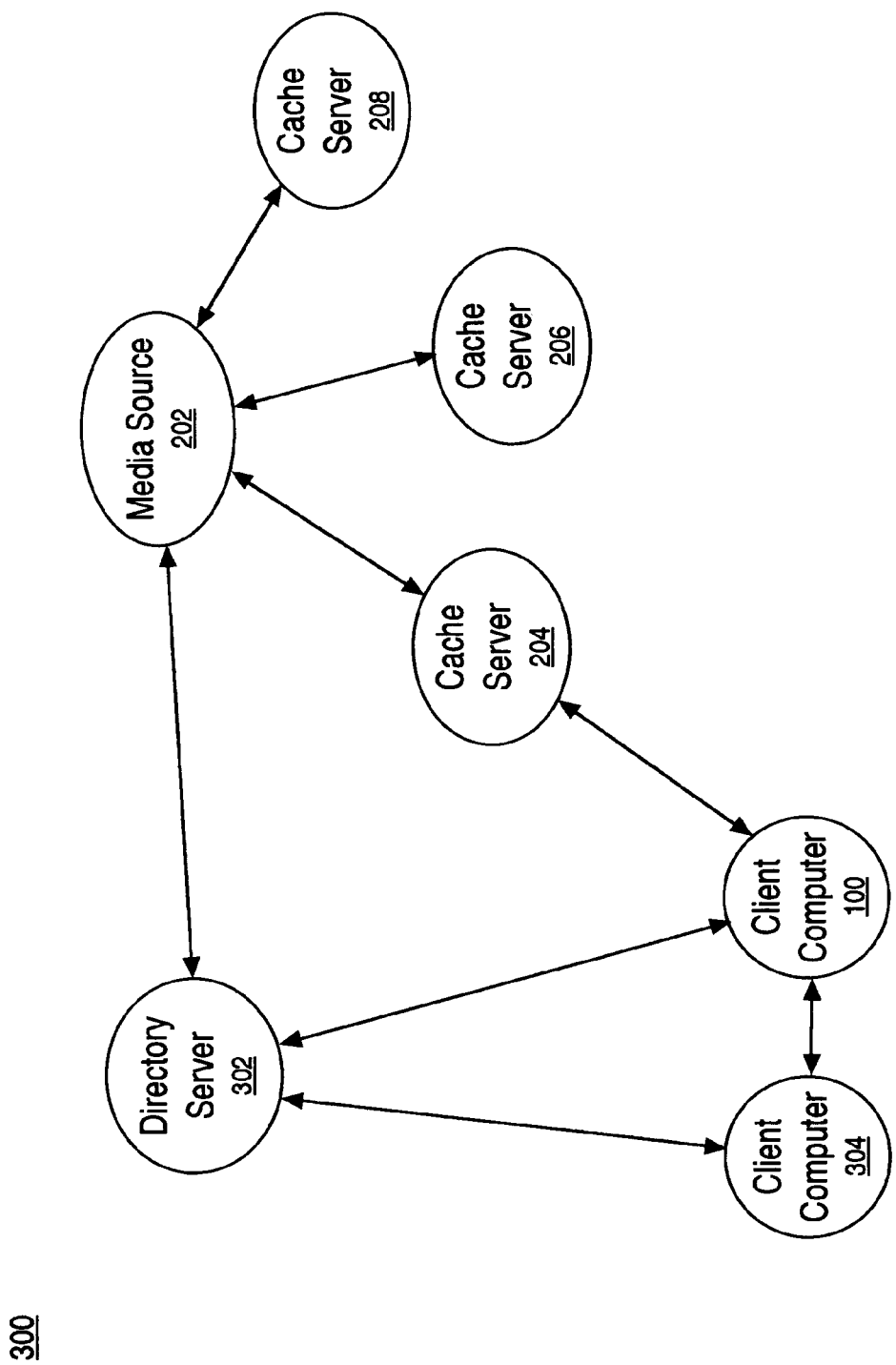
FIG. 3 is a block diagram illustrating another embodiment of a dynamic media distribution infrastructure in accordance with the present invention.

FIG. 3 is a block diagram illustrating one embodiment of a dynamic media distribution infrastructure 300 in accordance with the present invention. The general idea of the present embodiment is that a directory server 302 along with special software regulate the distribution of media content to client computers (e.g., 100 and 304). Additionally, once one or more client computers (e.g., 100 and 304) download media content along with the special software from a media supplier, they become media suppliers to other client computers. As such, the present embodiment provides a dynamic media distribution infrastructure.

It should be appreciated that media content of the present embodiment is well suited to include a wide variety of media content in any format. For example, the media content may include audio, video, graphics, information, data, and/or software. Moreover, a media supplier of the present embodiment is well suited to include media sources (e.g., 202), cache server computers (e.g., 204–208), client computers, and/or any other type of device that has media content available for download.

Dynamic media distribution infrastructure 300 includes media source 202 (e.g., radio station, television broadcast company, graphics vendor, television cable company, software vendor, publisher, and the like) coupled to cache server computers 204–208. As such, cache server computers 204–208 are coupled to receive and store media content output from media source 202 for subsequent distribution to client computers (e.g., 100 and 304). Furthermore, a directory server computer 302 is coupled to media source 202 and client computers 100 and 304. Additionally, client computer 100 is coupled to client computer 304. It should be appreciated that media source 202, cache servers 204–208, directory server 302, and client computers 100 and 304 of the present embodiment are well suited to be coupled in a wide variety of implementations. For example, these several devices of media distribution infrastructure 300 may be coupled via coaxial cable, copper wire, the Internet, fiber optics, wireless communication, and the like. Moreover, media source 202, cache servers 204–208, directory server 302, and client computer 304 may be implemented in a variety ways in accordance with the present embodiment. For example, the several different devices of infrastructure 300 may each be implemented in a manner similar to computer system 100 of FIG. 1. However, the devices of infrastructure 300 are not strictly limited to such an implementation.

Within the dynamic media distribution infrastructure 300 of FIG. 3, it is understood that media content may be distribution in a variety of ways. For example, when a user of client computer 100 desires to download media content within infrastructure 300, the user may cause client computer 100 to initially communicate with directory server 302. While communicating, the user of client computer 100 may have to register with directory server 302 before downloading media content. This registration process may include the user of client computer 100 inputting and specifying the particular media content he or she desires to download, who is allowed to or restricted from copying that media content once it is downloaded to client computer 100, and the like. Furthermore, if the user is required to pay for downloading the media content, the registration process may include the user inputting (for example) his or her name, credit card number, and/or mailing address. It should be appreciated that this registration information may be subsequently transmitted by directory server 302 to media source 202 for further processing and/or collection.

Once the registration process is completed, directory server 302 may couple (e.g., automatically) client computer 100 to a media supplier (e.g., one proximately located to client computer 100) which has the requested media content. Conversely, directory server 302 may provide a list of active media suppliers to client computer 100 and request that its user choose a media supplier to receive the requested media content from. In order to create the list of media suppliers, directory server 302 may determine which media suppliers have the media content requested by client computer 100 by checking a list. Additionally, directory server 302 may determine which media suppliers are currently active. Moreover, directory server 302 may determine which media supplier is proximately located to client computer 100. Once the list of active media suppliers is created by directory server 302, the user of client computer 100 is able to choose a media supplier to receive the requested media content from. Once a media supplier is chosen, directory server 302 couples client computer 100 to that media supplier.

Once communicatively coupled to a media supplier (e.g., cache server 204), client computer 100 is capable of downloading the desired media content. During the downloading process, the special software of the present embodiment operating on the media supplier encrypts and transmits the desired media content to client computer 100 which may subsequently store it. Within the present embodiment, it should be appreciated that the media content may or may not be encrypted differently each time it is output by a media supplier. Sometime during the downloading process, the special software operating on the media supplier also transmits an encryption key to client computer 100 enabling it to subsequently decrypt and use the encrypted media content. Furthermore, during the downloading process the special software operating on the media supplier also transmits (e.g., unknowingly) a copy of the special software to client computer 100. It is important to note that within the present embodiment the special software transmitted to client computer 100 may not allow its corresponding media content to be downloaded by another client device without that client device first communicating with directory server 302. Once the downloading process has been completed, the media supplier discontinues communication with client computer 100.

With reference still to FIG. 3, it should be understood that once client computer 100 has successfully downloaded the requested media content along with the special software from the media supplier, client computer 100 is capable of being a media supplier to other client computers (e.g., 304). For example, if a user of client computer 304 desires to download media content within infrastructure 300, the user may cause client computer 304 to initially communicate with directory server 302. As previously mentioned, directory server 302 along with the special software regulate the distribution of media content within distribution infrastructure 300. As such, in order to download media content, it is appreciated that client computer 304 will go through the same registration process as client computer 100 (FIG. 3) went through, described above.

Upon completion of the registration process, directory server 302 may couple (e.g., automatically) client computer 304 to an active media supplier which has the requested media content. For example, directory server 302 may couple client computer 304 to client computer 100 because it is proximately located to client computer 304. Conversely, directory server 302 may provide a list of active media suppliers to client computer 304 and request that its user choose a media supplier to receive the requested media content from. In order to create the list of media suppliers, directory server 302 may determine which media suppliers have the media content requested by client computer 304 by checking a list stored within one of its memory devices. If client computer 100 has the desired media content, directory server 302 may determine whether the user of client computer 100 (during its registration process) restricted access to client computer 304. Additionally, directory server 302 may determine which media suppliers are currently active. Moreover, directory server 302 may determine which media supplier is proximately located to client computer 304. Once the list of active media suppliers is created by directory server 302, the user of client computer 304 is able to choose a media supplier to receive the requested media content from. Once a media supplier is chosen, directory server 302 causes client computer 304 to couple to that media supplier.

Once communicatively coupled to a media supplier (e.g., client computer 100) of FIG. 3, client computer 304 is capable of downloading the desired media content. It is also appreciated that the special software stored on client computer 100 controls the media content downloading process in accordance with the present embodiment from one client computer to other client computers (e.g., 304). For example, the special software operating on client computer 100 encrypts and transmits the requested media content to client computer 304 which may subsequently store it. Within the present embodiment, it should be appreciated that the media content may or may not be encrypted differently each time it is output by a media supplier. Moreover, at some point during the downloading process, the special software causes client computer 100 to also transmit an encryption key to client computer 304 thereby enabling it to subsequently decrypt and use the encrypted media content. It should be understood that the encryption keys received by client computers 100 and 304 may be similar or different from each other. Furthermore, during the downloading process the special software causes client computer 100 to also transmit (e.g., unknowingly) a copy of the special software of the present embodiment to client computer 304. As previously mentioned, the special software of the present embodiment may not allow its corresponding media content to be downloaded without a client device first interacting with directory server 302. Once the downloading process has been completed, client computer 100 subsequently discontinues communication with client computer 304. It is appreciated that once client computer 304 has successfully downloaded the requested media content along with the special software from client computer 100, client computer 304 is capable of being a media supplier in a manner similar to client computer 100. Therefore, the dynamic media distribution infrastructure 300 is able to continue to grow larger as more client computers download media content and the special software.

Referring still to FIG. 3, it should be understood that there are different operational embodiments for the dynamic media distribution infrastructure 300 in accordance with the present invention. For example, instead of client computers (e.g., 100 and 304) each receiving an encryption key from a media supplier during their downloading process of encrypted media content, they may each receive an encryption key from directory server 302 during their registration process. In this manner, directory server 302 controls the distribution of encryption keys which are utilized by client computers to decrypt and use the encrypted media content. It should be appreciated that the encryption key received by each client computer (e.g., 100 and 304) may be similar or different from each other.

Within another operational embodiment of dynamic media distribution infrastructure 300, client computer 304 does not initially communicate with directory server 302 in order to download desired media content. Instead, client computer 304 directly communicates with the special software of client computer 100 in order to download encrypted media content and a copy of the special software (e.g., unknowingly) from client computer 100. However, client computer 304 does not receive an encryption key capable of decrypting the encrypted media content received from client computer 100. Therefore, in order to receive an encryption key to decrypt and utilize the encrypted media content, client computer 304 has to communicate with directory server 302 and go through the registration process described above. In this fashion, directory server 302 controls which client computers are capable of using the encrypted media content.

There are several advantages associated with the dynamic media distribution infrastructure 300 of FIG. 3 which are very similar to the advantages associated with the dynamic media distribution infrastructure 200 of FIG. 2. For example, the present embodiment provides a media distribution infrastructure which is not expensive to expand since the client computers do not need to be purchased in order to add them to the distribution infrastructure. Furthermore, the dynamic media distribution infrastructure 300 is not easily overwhelmed by too many requests for media downloads because the more clients that download media content, the more media content suppliers exist. Moreover, dynamic media distribution infrastructure 300 is more efficient in fulfilling media content download requests by enabling client computers to download media content from a larger amount of media content suppliers.

Figure 4:
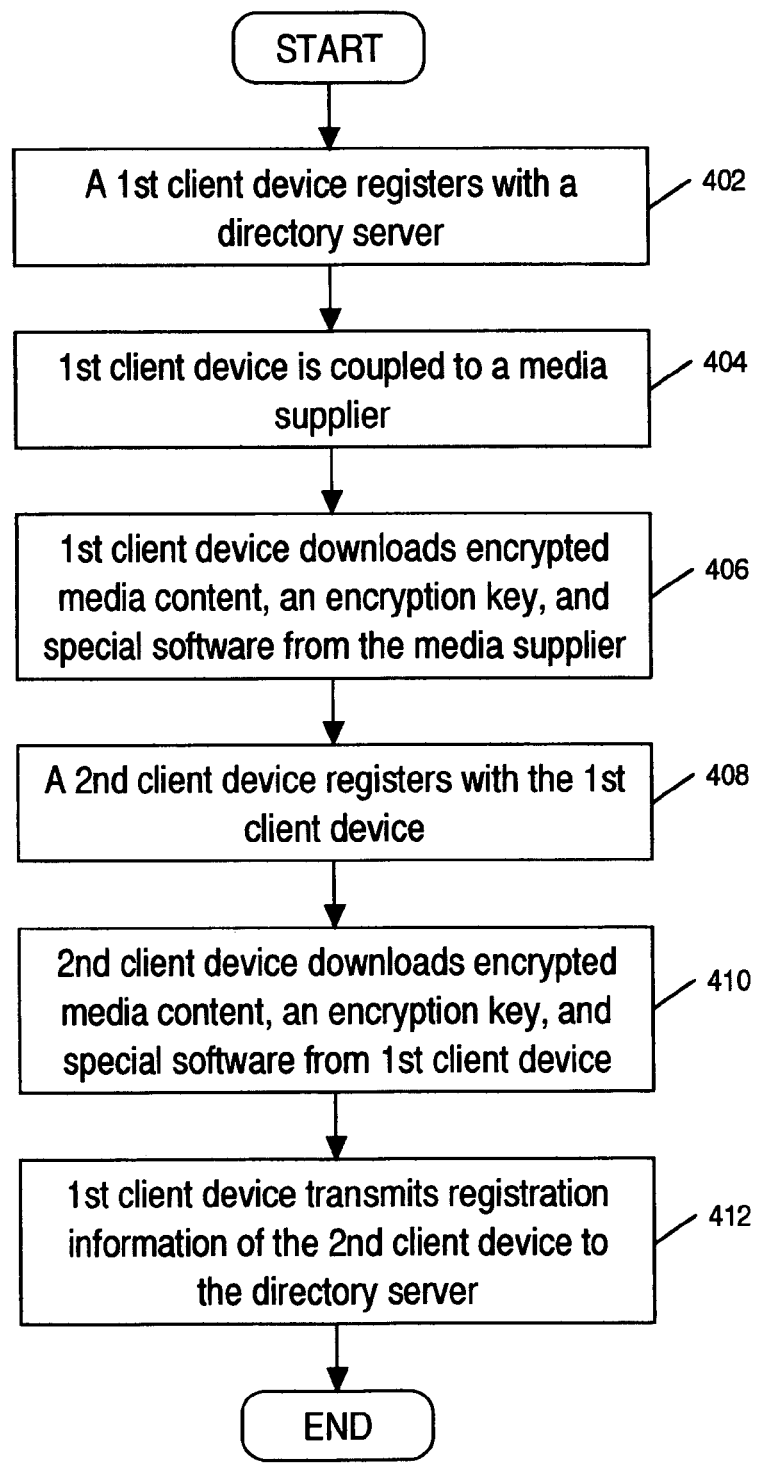
FIG. 4 is a flowchart of steps performed in accordance with one embodiment of the present invention for dynamically distributing media content.

FIG. 4 is a flowchart 400 of steps performed in accordance with one embodiment of the present invention for dynamically distributing media content. It should be understood that media content of the present embodiment is well suited to include a wide variety of media content in many different formats. For example, the media content may include audio, video, graphics, information, data, and/or software. Flowchart 400 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 400, such steps are exemplary. That is, the present embodiment is well suited to performing various other steps or variations of the steps recited in FIG. 4. Within the present embodiment, it should be appreciated that the steps of flowchart 400 can be performed by software or hardware or any combination of software and hardware.

In step 402, in the present embodiment, a first client device (e.g., 100 of FIG. 2) communicatively couples with a directory server (e.g., 210) and goes through a registration process. It should be appreciated that the registration process of step 402 may be similar to the registration process described above with reference to FIG. 2. That is, the registration process of step 402 may include the first client device specifying the particular media content to download. Furthermore, if payment is required to download the media content, the registration process of step 402 may include the first client device transferring a name, credit card number, and/or mailing address to the directory server. The registration information may be subsequently transmitted by the directory server to a media source for further processing and/or collection.

At step 404 of FIG. 4, the first client device is coupled to a media supplier. A media supplier of the present embodiment is well suited to include media sources, cache server computers, client devices, and/or any other type of device which has media content available for download. It should be appreciated that the first client device may be coupled to a media supplier in a variety of way in accordance with the present embodiment. For example, the directory server may provide a list of media suppliers to the first client device and request that a choice be made as to which media supplier should provide the requested media content. Once a media supplier is chosen, the directory server couples the first client device at step 404 to that media supplier. However, the directory server may not provide the first client device a list of media suppliers to choose from. Instead, the directory server may couple (e.g., automatically) the first client device at step 404 to a media supplier (e.g., one proximately located to the first client device) which has the requested media content.

In step 406, the first client device downloads the requested media content (in an encrypted format), an encryption key to decrypt and use the encrypted media content, and a copy of the special software from the media supplier. It is understood that the special software of the present embodiment operates in a manner similar to the special software described above with reference to FIG. 2. Once the first client device has successfully downloaded the requested media content and special software from the media supplier, the first client device is capable of being a media supplier to other client devices.

In step 408 of FIG. 4, in the present embodiment, a second client device (e.g., 212 of FIG. 2) communicatively couples with the first client device (e.g., 100) and goes through a registration process. For example, at step 408 the second client device communicates with the special software of the present embodiment stored on the first client device. This special software provides the download interface whereby the second client device is able to download specific media content stored by the first client device. As part of the download interface, the special software includes a registration process similar to the one described above with reference to step 402.

At step 410, the second client device downloads the requested media content (in an encrypted format), an encryption key to decrypt and use the encrypted media content, and a copy of the special software from the first client device. It should be understood that the encryption keys received by the first and second client devices may be similar or different from each other. It is appreciated that once the second client device has successfully downloaded the requested media content and special software from the first client device, the second client device is capable of being a media supplier to other client devices. In step 412, the first client device of the present embodiment transmits the registration information of the second client device to the directory server. It is appreciated that the directory server may transfer the received registration information of the second client to a media source for further processing and/or collection. Once step 412 is completed, flowchart 400 is exited.

Figure 5:
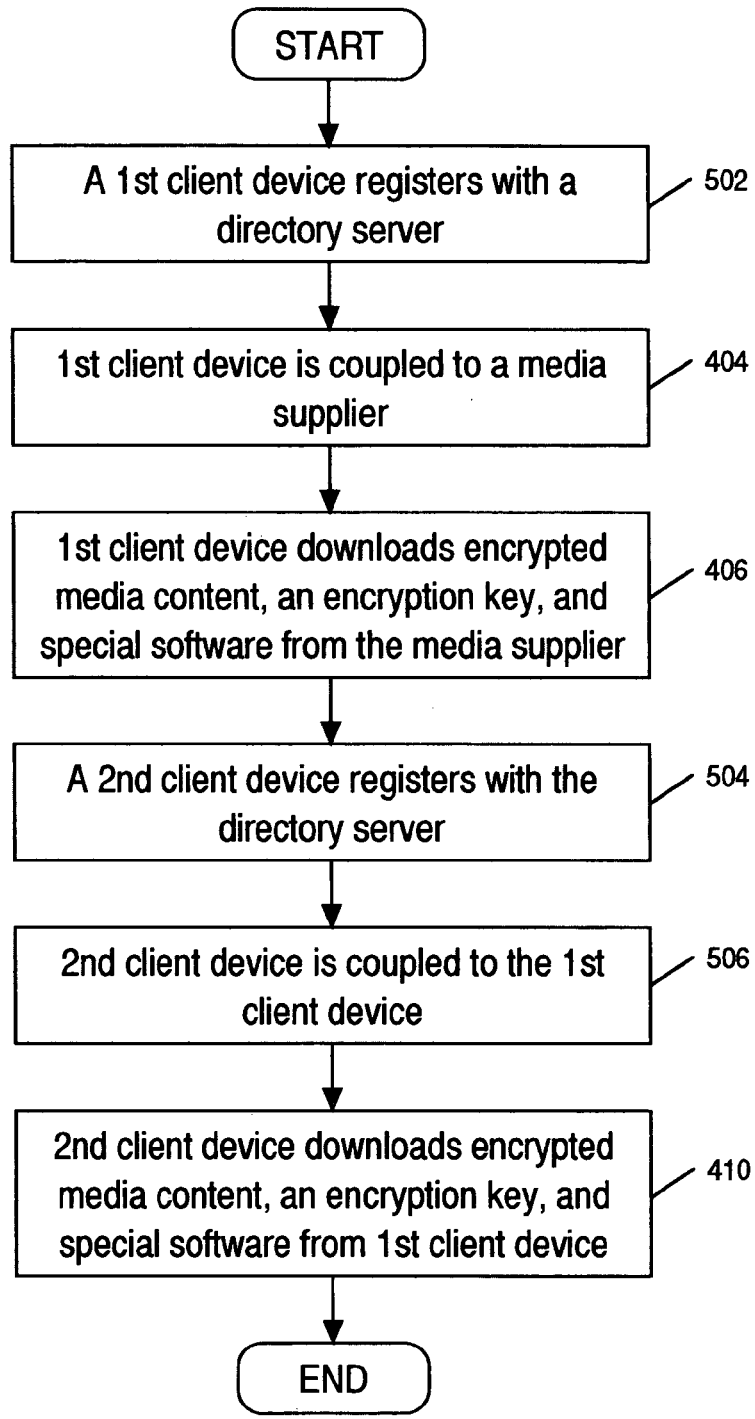
FIG. 5 is a flowchart of steps performed in accordance with another embodiment of the present invention for dynamically distributing media content.

FIG. 5 is a flowchart 500 of steps performed in accordance with one embodiment of the present invention for dynamically distributing media content. It should be understood that media content of the present embodiment is well suited to include a wide variety of media content in many different formats. For example, the media content may include audio, video, graphics, information, data, software, and/or the like. Flowchart 500 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 500, such steps are exemplary. That is, the present embodiment is well suited to performing various other steps or variations of the steps recited in FIG. 5. Within the present embodiment, it should be appreciated that the steps of flowchart 500 can be performed by software or hardware or any combination of software and hardware. It should be understood that steps 404, 406, and 410 of FIG. 5 are similar to steps 404, 406, and 410 of FIG. 4, described above.

At step 502, in the present embodiment, a first client device (e.g., 100 of FIG. 3) communicatively couples with a directory server (e.g., 302) and goes through a registration process. It should be appreciated that the directory server and special software regulate the distribution of media content within the present embodiment. Furthermore, it should be understood that the registration process of step 502 may be similar to the registration process described above with reference to FIG. 3. That is, the registration process of step 502 may include the first client device specifying the particular media content to download, which devices are allowed to or restricted from copying that media content once it is downloaded to the first client device, and the like. Additionally, if payment is required to download the media content, the registration process of step 502 may include the first client device transferring a name, credit card number, and/or mailing address to the directory server. The registration information may be subsequently transmitted by the directory server to a media source for further processing and/or collection.

In step 504 of FIG. 5, a second client device (e.g., 304 of FIG. 3) communicatively couples with the directory server (e.g., 302) and goes through a registration process. It is understood that the second client device may go through the same registration process as the first client device went through at step 502, described above. In step 506, the second client device is communicatively coupled to the first client device. It should be appreciated that the second client device may be coupled to the first client device at step 506 in a variety of ways in accordance with the present embodiment. For example, the directory server may provide a list of media suppliers (which includes the first client device) to the second client device and request that a choice be made as to which media supplier should provide the requested media content. If the first client device is chosen, the directory server couples the second client device at step 506 to the first client device. However, the directory server may not provide the second client device a list of media suppliers to choose from. Instead, the directory server may couple (e.g., automatically) the second client device at step 506 to the first client device because it has the requested media content. It is understood that a media supplier of the present embodiment is well suited to include media sources, cache server computers, client devices, and any other type of device which has media content available for download.

Figure 6:
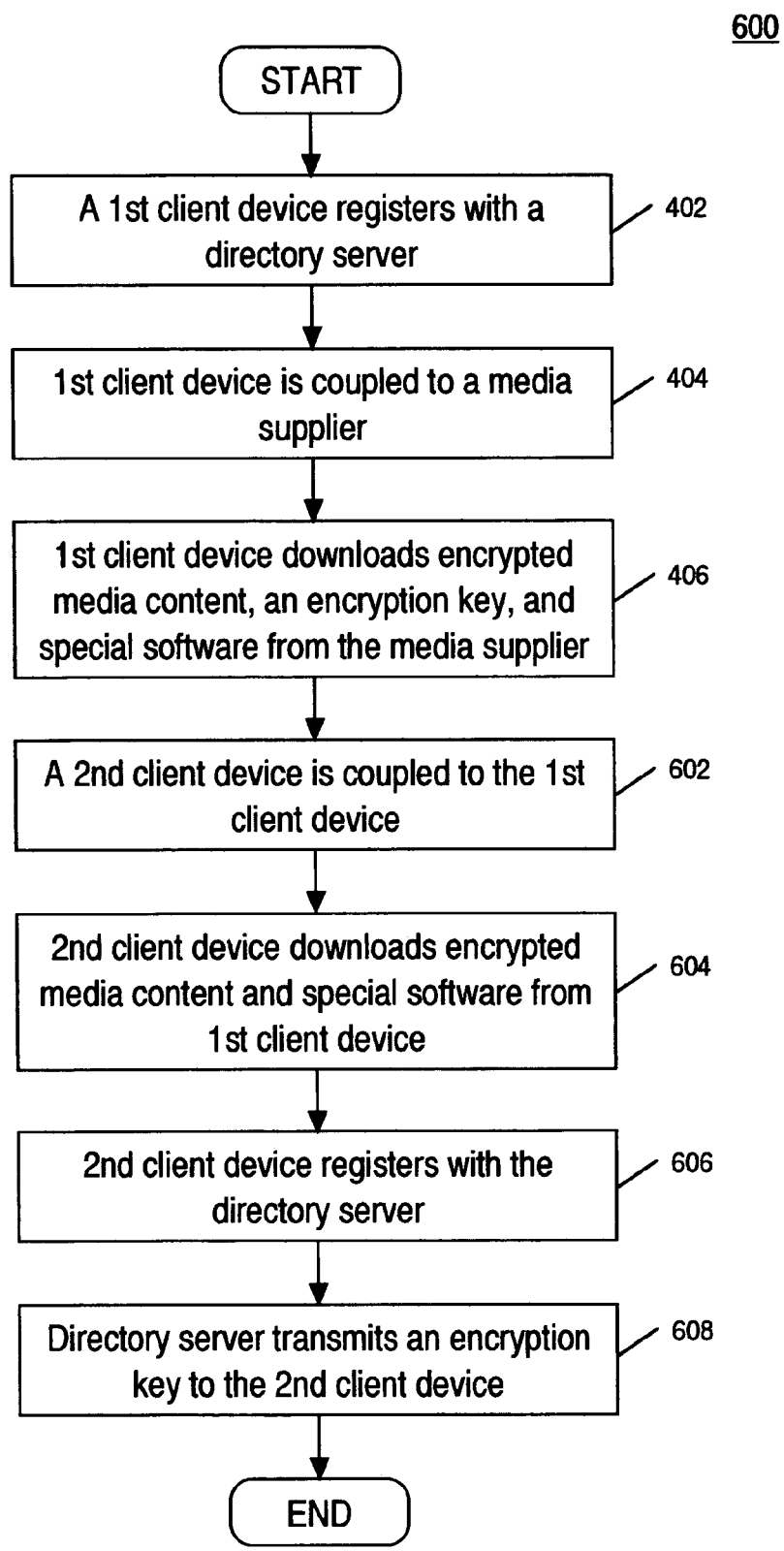
FIG. 6 is a flowchart of steps performed in accordance with yet another embodiment of the present invention for dynamically distributing media content.

FIG. 6 is a flowchart 600 of steps performed in accordance with one embodiment of the present invention for dynamically distributing media content. It should be appreciated that media content of the present embodiment is well suited to include a wide variety of media content in many different formats. For example, the media content may include audio, video, graphics, documentation, data, software, and/or the like. Flowchart 600 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 600, such steps are exemplary. That is, the present embodiment is well suited to performing various other steps or variations of the steps recited in FIG. 6. Within the present embodiment, it should be appreciated that the steps of flowchart 600 can be performed by software or hardware or any combination of software and hardware. It should be understood that steps 402, 404, and 406 of FIG. 6 are similar to steps 402, 404, and 406 of FIG. 4, described above.

At step 602, a second client device (e.g., 304 of FIG. 3) is communicatively coupled to the first client device (e.g., 100). In step 604, in the present embodiment, the second client device downloads media content (in an encrypted format) and the special software from the first client device. It is important to note that the second client device did not receive an encryption key enabling it to decrypt and use the encrypted media content. However, once the second client device has successfully downloaded the requested media content and special software from the first client device, the second client device is capable of being a media supplier in a manner similar to the first client device. It is appreciated that a media supplier of the present embodiment is well suited to include media sources, cache server computers, client devices, and/or any other type of device which has media content available for download.

In step 606 of FIG. 6, a second client device (e.g., 304 of FIG. 3) communicatively couples with the directory server (e.g., 302) and goes through a registration process. It is understood that the second client device may go through the same registration process as the first client device went through at step 402, described above. At step 608, once the registration process of the second client device is completed, the directory server transmits an encryption key to the second client device enabling it to decrypt and use the previously received encrypted media content. It should be appreciated that the encryption keys received by the first and second client devices may be similar or different from each other. Once step 608 is completed, the present embodiment exits flowchart 600.

Accordingly, the present invention provides a method and system which provides a dynamic media distribution infrastructure which is not expensive to expand. Furthermore, the present invention provides a method and system which provides a dynamic media distribution infrastructure which is more efficient in fulfilling media content download requests by enabling client devices to download media content from a larger amount of media content suppliers. Moreover, the present invention provides a method and system which provides a dynamic media distribution infrastructure which is not easily overwhelmed by too many requests for media downloads because the more clients that download media content, the more media content suppliers exist.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   performing a registration process with a directory device, said registration process comprises a first client device specifying media content to download;
   said directory device supplying to said first client device a list of active media suppliers for providing said media content after said specifying;
   said directory device coupling said first client device to a media supplier chosen from said list of active media suppliers;
   software operating on said media supplier encrypting and transmitting said media content to said first client device after said coupling said first client device to said media supplier, said software regulates distribution of said media content;
   said software transmitting to said first client device an encryption key capable of decrypting said media content;
   said software transmitting a copy of said software to said first client device;
   said copy of said software operating on said first client device encrypting and transmitting said media content to a second client device; and
   said copy of said software transmitting to said second client device said encryption key;
   wherein during downloading of said media content to said second client device, said copy of said software causes the first client device to transmit a copy of said software to said second client device.

2. The method as described in claim 1 further comprising:
   coupling said second client device to said directory device.

3. The method as described in claim 1 further comprising: coupling said second client device to said first client device.

4. The method as described in claim 1 wherein said copy of said software does not allow said media content to be downloaded without a client device interacting with its interface.

5. The method as described in claim 1 wherein said copy of said software does not allow said media content to be downloaded by said second client device without said second client device first communicating with said directory device.

6. The method as described in claim 1 further comprising:
   said directory device creating said list of said active media suppliers.

7. The method as described in claim 1 wherein said encrypted media content is video, audio, graphics, software, or information.

8. The method as described in claim 1 wherein said media supplier comprises a computer.

9. The method as described in claim 1 wherein said media supplier comprises a third client device.

10. The method as described in claim 1 wherein said first client device is a computer, set-top-box, or digital recording/play back device.

11. The method as described in claim 1 further comprising:
    supplying to said second client device a second list of active media suppliers for providing said media content.

12. A method comprising:
    coupling said first client device to a directory device and specifying media content to download;
    said directory device supplying to said first client device a list of media suppliers for providing said media content after said specifying;
    software operating on a media supplier chosen from said list encrypting and transmitting said media content to said first client device, said software controls distribution of said media content;
    said software transmitting a copy of said software to said first client device;
    downloading to said first client device an encryption key capable of decrypting said media content;
    said copy of said software operating on said first client device encrypting and transmitting said media content to a second client device; and
    downloading to said second client device said encryption key;
    wherein during downloading of said media content to said second client device, said copy of said software causes the first client device to transmit a copy of said software to said second client device.

13. The method as described in claim 12 further comprising:
    coupling said second client device to said directory device.

14. The method as described in claim 12 further comprising:
    coupling said second client device to said first client device.

15. The method as described in claim 12 wherein said first client device receives said first encryption key from said media supplier.

16. The method as described in claim 12 wherein said first client device receives said first encryption key from said directory device.

17. The method as described in claim 12 wherein said second client device receives said second encryption key from said first client device.

18. The method as described in claim 12 wherein said second client device receives said second encryption key from said directory device.

19. The method as described in claim 12 wherein said encrypted media content is video, audio, graphics, software, or information.

20. The method as described in claim 12 wherein said media supplier comprises a third client device.

21. The method as described in claim 12 wherein said first client device is a computer, set-top-box, or digital recording/play back device.

22. The method as described in claim 12 further comprising:
   supplying to said second client device a second list of media suppliers for providing said media content, wherein said second list of media suppliers comprises said first client device.

23. A system comprising:
   a media supplier upon which software operates for encrypting and transmitting media content and for transmitting a copy of said software, said software regulates distribution of said media content;
   a first client device coupled to said media supplier and for receiving said media content from said media supplier and for receiving said copy of said software, said first client device for receiving a first encryption key for decrypting said media content;
   a directory device for coupling said first client device to said media supplier, and for supplying to said first client device a list of active media suppliers that comprises said media supplier after said first client device specifies said media content to download; and
   a second client device coupled to said first client device and for receiving said media content from said first client device, said second client device for receiving a second encryption key for decrypting said media content, wherein during downloading of said media content to said second client device, said copy of said software causes the first client device to transmit a copy of said software to said second client device.

24. The system of claim 23 wherein said media content that is encrypted is video, audio, graphics, software, or information.

25. The system of claim 23 wherein said first client device is a computer, set-top-box, or digital recording/play back device.

26. The system of claim 23 wherein said second client device is a computer, set-top-box, or digital recording/play back device.

27. The system of claim 23 wherein said first client device receives said first encryption key from said media supplier.

28. The system of claim 23 wherein said first client device receives said first encryption key from said directory device.

29. The system of claim 23 wherein said second client device receives said second encryption key from said first client device.

30. The system of claim 23 wherein said second client device receives said second encryption key from said directory device.

31. The system of claim 23 wherein said media supplier comprises a third client device.

32. The system of claim 23 wherein said directory device for coupling said second client device to said first client device.

* * * * *